(12) United States Patent
Liu

(10) Patent No.: US 12,069,508 B2
(45) Date of Patent: Aug. 20, 2024

(54) NETWORK TRANSMISSION CONTROL METHOD AND APPARATUS

(71) Applicant: ZTE Corporation, Shenzhen (CN)

(72) Inventor: Fulei Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/613,264

(22) PCT Filed: Jul. 24, 2020

(86) PCT No.: PCT/CN2020/104642
§ 371 (c)(1),
(2) Date: Nov. 22, 2021

(87) PCT Pub. No.: WO2021/013260
PCT Pub. Date: Jan. 28, 2021

(65) Prior Publication Data
US 2022/0225157 A1    Jul. 14, 2022

(30) Foreign Application Priority Data
Jul. 25, 2019   (CN) .......................... 201910676364.4

(51) Int. Cl.
*H04W 28/02*   (2009.01)
*H04L 47/193*   (2022.01)

(52) U.S. Cl.
CPC ....... *H04W 28/0273* (2013.01); *H04L 47/193* (2013.01)

(58) Field of Classification Search
None
See application file for complete search history.

(56) References Cited

U.S. PATENT DOCUMENTS

| | | | |
|---|---|---|---|
| 2008/0212487 A1* | 9/2008 | Silvestri | H04L 69/16 370/253 |
| 2013/0021933 A1 | 1/2013 | Kovvali | |
| 2013/0235843 A1 | 9/2013 | Gohari | |
| 2017/0310601 A1* | 10/2017 | Yu | H04L 43/08 |
| 2017/0339711 A1* | 11/2017 | Belghoul | H04W 28/0273 |
| 2018/0219787 A1* | 8/2018 | Li | H04W 28/0273 |
| 2018/0227801 A1* | 8/2018 | Dudda | H04L 47/823 |
| 2020/0374201 A1* | 11/2020 | Wang | H04L 67/10 |

FOREIGN PATENT DOCUMENTS

| | | | |
|---|---|---|---|
| CN | 105392157 A | | 3/2016 |
| CN | 108322401 A | | 7/2018 |
| CN | 108934044 A | | 12/2018 |
| CN | 109963305 A | | 7/2019 |
| CN | 110401574 A | * | 11/2019 |
| WO | 2007064712 A2 | | 6/2007 |

OTHER PUBLICATIONS

International Search Report for corresponding application PCT/CN2020/104462 filed Jul. 24, 2020; Mail date Oct. 10, 2020.

* cited by examiner

*Primary Examiner* — Saumit Shah
(74) *Attorney, Agent, or Firm* — CANTOR COLBURN LLP

(57) ABSTRACT

A network transmission control method and apparatus are provided. The method includes: obtaining a resource feature of a base station; determining a state of the base station according to the obtained resource feature of the base station; and adjusting a Transmission Control Protocol (TCP) layer parameter according to the state of the base station.

20 Claims, 2 Drawing Sheets

NETWORK TRANSMISSION CONTROL METHOD AND APPARATUS

CROSS REFERENCE

This application is a National Stage Filing of the PCT International Application No. PCT/CN2020/104642 filed on Jul. 24, 2020, which claims priority to Chinese Application No. 201910676364.4 filed on Jul. 25, 2019, the entirety of which is herein incorporated by reference.

TECHNICAL FIELD

The present disclosure relates to, but is not limited to, wireless communication technologies, and more particularly to a network transmission control method and apparatus.

BACKGROUND

At present, a Transmission Control Protocol (TCP) congestion control algorithm well known in the industry is designed for a wired network. For example, in a packet loss-based congestion control algorithm, such as a Reno congestion control algorithm and a Cubic congestion control algorithm, the occurrence of packet loss is considered as a sign of congestion, and a slow detection manner is adopted, in which a congestion window is gradually increased, and when packet loss occurs, the congestion window is reduced. For another example, in a delay-based congestion control algorithm, such as a Vegas congestion control algorithm and a FastTCP congestion control algorithm, the occurrence of delay increase is considered as a sign of congestion, the congestion window is increased when the delay increases, and the congestion window is decreased when the delay decreases. For still another example, in a link capacity-based congestion control algorithm, such as a BBR, after measuring a network bandwidth and a time delay in real time, it is determined that congestion occurs when the total amount of packets on the network is greater than the product of the network bandwidth and the time delay. For still another example, in a learning-based congestion control algorithm, such as a Remy congestion control algorithm, there is no specific congestion signal, and a control strategy is formed by using a machine learning method based on training data by means of an evaluation function.

Generally, the TCP congestion control algorithm considers that packet loss in a network is caused by network congestion, and therefore, network congestion is alleviated by reducing the sending rate of packets.

SUMMARY

The embodiments of the present disclosure provide a network transmission control method and apparatus, which are applicable to a transmission network involving wireless transmission, and can ensure the service experience of users.

The embodiments of the present disclosure provide a network transmission control method, including: obtaining a resource feature of a base station; determining a state of the base station according to the obtained resource feature of the base station; and adjusting a TCP layer parameter according to the state of the base station.

The embodiments of the present disclosure also provide a computer-readable storage medium, storing computer-executable instructions, wherein the computer-executable instructions are used for executing the network transmission control method mentioned above.

The embodiments of the present disclosure also provide an apparatus for implementing network transmission control, including a processor and a memory, wherein the memory stores a computer program which is able to run on the processor and is used for executing the operations of the network transmission control method mentioned above.

The embodiments of the present disclosure also provide a network transmission control apparatus, including: an obtaining module, a processing module and a controlling module, wherein the obtaining module is configured to obtain a resource feature of a base station; the processing module is configured to determine a state of the base station according to the obtained resource feature of the base station; and the controlling module is configured to adjust a TCP layer parameter according to the state of the base station In the scheme of the embodiments of the present disclosure, a resource feature of a base station is obtained, a state of the base station is determined according to the obtained resource feature of the base station, and a TCP layer parameter is adjusted according to the state of the base station. The scheme is applicable to a transmission network involving wireless transmission, and guarantees the service experience of users.

In some exemplary embodiments, the scheme solves the problem that a TCP parameter cannot be adjusted according to a feature of a wireless base station in a transmission network including a Third Generation Partnership Project (3GPP) wireless network.

Additional features and advantages of the present disclosure will be set forth in the description that follows, and in part will be obvious from the description, or may be learned by practice of the embodiments of the present disclosure. Objects and other advantages of the present disclosure may be realized and attained by the structure particularly pointed out in the description, claims, and drawings.

BRIEF DESCRIPTION OF THE DRAWINGS

The accompanying drawings described herein are used to provide a deeper understanding of the scheme of the present disclosure, and constitute a part of the description. The exemplary embodiments of the present disclosure and the drawings are used together to explain the scheme of the embodiments of the present disclosure. The drawings and the exemplary embodiment do not constitute limitations to the scheme of the present disclosure.

DETAILED DESCRIPTION

Figure 1:
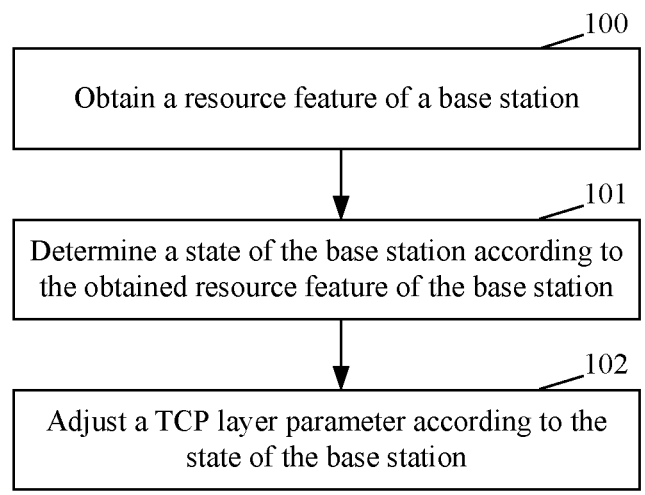
FIG. 1 is a flowchart of a network transmission control method according to some embodiments of the present disclosure.

In a typical configuration of the embodiments of the present disclosure, a computing device includes one or more processors (e.g., Central Processing Unit (CPU)), an input/output interface, a network interface, and a memory.

The memory may include a non-transitory storage in a computer-readable medium, a random access memory (RAM), and/or a non-volatile memory, such as a read-only memory (ROM) or a flash RAM. The memory is an example of a computer-readable medium.

The computer-readable medium includes both transitory and non-transitory, and removable and non-removable. The medium can implement the function of information storage in any method or technology. The information may be computer-readable instructions, data structures, modules of a program, or other data. Examples of the computer storage medium include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape disk storage or other magnetic storage devices, or any other non-transmission medium, which may be used to store information accessible by a computing device. As defined herein, the computer-readable medium does not include transitory media, such as modulated data signals and carrier waves.

In order to make the objects, technical schemes and advantages of the present disclosure more apparent, the embodiments of the present disclosure will be described hereinafter in detail with reference to the drawings. It should be noted that, in the case of no conflict, the embodiments in the present disclosure and the features in the embodiments may be merged arbitrarily with each other.

When a transmission network involves wireless transmission, packet loss is likely to be caused by fluctuation of a wireless environment and movement of a terminal, rather than transmission congestion. If a serving end still controls network transmission by reducing a sending rate of packets, a TCP transmission rate will be seriously degraded. That is to say, the TCP algorithm provided in the related art is not suitable for network transmission control of a network involving wireless transmission.

With regard to the case where a TCP transmission path contains a wireless network, the embodiments of the present disclosure propose to optimize a TCP layer parameter of a wireless network according to feature information of a wireless base station of the wireless access network, so as to achieve the most efficient sending of TCP packets, and prevent the problems of packet congestion, packet loss, and packet transmission delay increase of the base station, thereby achieving the optimization of network control.

According to the network control method provided in the embodiments of the present disclosure, a TCP layer parameter is adjusted according to a change in the wireless environment and feature, so that a good control effect can be achieved on all TCP services, redundant TCP retransmission is avoided, wireless resources are fully utilized, and user experience is improved.

FIG. 1 is a flowchart of a network transmission control method according to some embodiments of the present disclosure. As shown in FIG. 1, the method includes operations 100 to 102 which are described in detail below.

At 100, a resource feature of a base station is obtained.

In an exemplary embodiment, the resource feature of the base station may include any one or any combination of the following:

a TCP downlink retransmission rate (which may be based on the amount of data or the number of packets), a Round-Trip Time (RTT), a TCP downlink average rate, a Packet Data Convergence Protocol (PDCP) cache, an air interface rate, etc.

In an exemplary embodiment, if there are history data for the resource feature of the base station, the resource feature of the base station collected before the current time point may be obtained from the history data.

In an exemplary embodiment, the resource feature of the base station may be collected according to a preset control period.

In an exemplary embodiment, the control period may be, for example, 1 hour, 2 hours, 6 hours, 12 hours, 1 day, 3 days, 5 days, 7 days, 14 days, 30 days, etc.

It should be noted that how to obtain the resource feature of the base station is not intended to be limited in the scope of protection of the present disclosure, and is not described herein.

In an exemplary embodiment, the base station may include, but is not limited to, a Third Generation (3G) base station, a Fourth Generation (4G) base station, a Fifth generation (5G) base station, or the like.

At 101, a state of the base station is determined according to the obtained resource feature of the base station.

In an exemplary embodiment, the operation 101 may include operations as follows.

The obtained resource feature of the base station is processed according to a preset processing strategy.

The state of the base station is determined according to the processing result.

In an exemplary embodiment, the operation of processing the obtained resource feature of the base station according to the preset processing strategy includes:

obtained resource feature data of the base station within a control period are processed according to the preset processing strategy to obtain the processing result reflecting the state of the base station.

In an exemplary embodiment, the operation of determining the state of the base station according to the processing result includes:

the processing result is compared with a preset threshold, and the state of the base station is determined according to a comparison result, for example, the state of the base station may include whether a transmission state is good or poor, or whether the base station is busy or idle, or whether a load of the base station is high or low.

In an exemplary embodiment, the control period is one day or multiple hours. The resource feature of the base station includes: a TCP downlink retransmission rate based on the amount of data and a TCP downlink retransmission rate based on the number of packets.

The operation of processing the obtained resource feature of the base station according to the preset processing strategy includes the following operations.

The data for each hour is respectively subjected to the following judgment: a processing result Q=TCP downlink retransmission rate (based on the amount of data)×k1+TCP downlink retransmission rate (based on the number of packets)×k2, where k1 and k2 are in a range of 0~1, for example, k1=0.5, k2=0.5, etc.

With regard to the processing result Q for each hour, if the processing result Q is greater than or equal to a preset first threshold, it is determined that the transmission state of the base station is poor within the hour; if the processing result Q is smaller than the preset first threshold, it is determined that the transmission state of the base station is good within the hour. In this way, 24 processing results Q or multiple processing results Q reflecting the transmission state of the base station can be obtained.

The operation of determining the state of the base station according to the processing result includes the following operations.

In 24 or multiple processing results of the base station, if n or more than n processing results reflect poor transmission state, it is determined that the transmission state of the base station is poor; if fewer than n processing results reflect poor transmission state, it is determined that the transmission state of the base station is good. The value of n may be preset and may be modified according to actual conditions.

In an exemplary embodiment, the control period is greater than one day. The resource feature of the base station includes: a TCP downlink retransmission rate based on the amount of data and a TCP downlink retransmission rate based on the number of packets. The operation of processing the obtained resource feature of the base station according to the preset processing strategy includes the following operations.

An average value of the TCP downlink retransmission rate (based on the amount of data) and an average value of the TCP downlink retransmission rate (based on the number of packets) for each same hour (for example, the same 9:00~10:00) per day in the control period are respectively calculated to obtain 24 sets of data of the TCP downlink retransmission rate (based on the amount of data) and 24 sets of data of the TCP downlink retransmission rate (based on the number of packets).

The data for each hour is respectively subjected to the following judgment: a processing result Q=an average TCP downlink retransmission rate (based on the amount of data)× k1+an average TCP downlink retransmission rate (based on the number of packets)×k2, where k1 and k2 are in a range of 0~1, for example, k1=0.5, k2=0.5, etc.

With regard to the processing result Q for each hour, if the processing result Q is greater than or equal to a preset first threshold, it is determined that the transmission state of the base station is poor within the hour; if the processing result Q is smaller than the preset first threshold, it is determined that the transmission state of the base station is good within the hour. In this way, 24 processing results Q reflecting the transmission state of the base station can be obtained.

The operation of determining the state of the base station according to the processing result includes the following operations.

In 24 processing results of the base station, if n or more than n processing results reflect poor transmission state, it is determined that the transmission state of the base station is poor; if fewer than n processing results reflect poor transmission state, it is determined that the transmission state of the base station is good. The value of n may be preset and may be modified according to actual conditions.

In an exemplary embodiment, the resource feature of the base station includes: a PDCP available cache and an air interface rate.

If the collected PDCP available cache and the air interface rate are data for each minute, then the operation of processing the obtained resource feature of the base station according to the preset processing strategy includes the following operations.

The data for each minute is accumulated to obtain data for each hour, so as to obtain an index for each hour.

The data for each hour is subjected to the following judgment: according to a clustering algorithm, such as a k-means algorithm, the available PDCP cache and the air interface rate are classified into two types, i.e. busy hour and idle hour. In this way, 24 values reflecting the load state of the base station, i.e., a busy time period or an idle time period, can be obtained.

The busy hours of the base station are merged to obtain a busy time period, for example, each base station may configure at most m busy time periods (for example, 3 busy time periods), and each busy time period may be represented by a busy start time and a busy end time. For two calculated busy time periods, if the time interval between the start time of the second busy time period and the end time of the first busy time period is less than or equal to a preset duration, such as j hours (for example, 2 hours), the two busy time periods are merged as one busy time period, and the start time of this merged busy time period is the start time of the first busy time period, and the end time of this merged busy time period is the end time of the second busy time period. For example, if the busy hours are 08:00~09:00, 11:00~12:00, 13:00~14:00, then the busy time period is 08:00~14:00 after the merging. When the number of merged busy time periods exceeds 3, in all the busy time periods, the two busy time periods with the shortest time interval therebetween are merged, and the same processing is circularly performed until 3 busy time periods remain.

In an exemplary embodiment, the control period is greater than 1 day, and the resource feature of the base station includes: a TCP downlink retransmission rate based on the amount of data and a TCP downlink average rate.

The operation of processing the obtained resource feature of the base station according to the preset processing strategy includes the following operations.

An average value of the TCP downlink retransmission rate (based on the amount of data) and an average value of the TCP downlink average rate for each same hour (for example, the same 9:00~10:00) per day in the control period are respectively calculated to obtain 24 processing results Q reflecting the load state of the base station.

The operation of determining the state of the base station according to the processing result includes the following operations.

First, the data for each hour is subjected to the following judgment.

If the TCP downlink retransmission rate (based on the amount of data) is greater than or equal to a first threshold thrd1 or the TCP downlink average rate is less than or equal to a second threshold thrd2, it is determined that the state of the base station within the hour is a high load state.

If the TCP downlink retransmission rate (based on the amount of data) is greater than or equal to a third threshold thrd3 or the TCP downlink average rate is less than or equal to a fourth threshold thrd4, it is determined that the state of the base station within the hour is a medium load state.

If the TCP downlink retransmission rate (based on the amount of data) is less than a third threshold thrd3 and the TCP downlink average rate is greater than a fourth threshold thrd4, the state of the base station within the hour is the low load state.

Then, 24 load state values (among three states) are obtained for each base station, and the state of the base station corresponding to the load state value with the largest occurrence is determined as the current state of the base station. For example, if the high load value occurs for the maximum number of times for a base station, the state of the base station is a high load state.

It should be appreciated that, the foregoing embodiments are merely used to describe implementation of operation 101 of the embodiments of the present disclosure. According to the foregoing embodiments of the present disclosure, those having ordinary skill in the art can easily obtain other implementations for determining the state of the base station under the resource feature of the base station, which are not described herein. The above embodiments are also not intended to limit the scope of the present disclosure.

At 102, a TCP layer parameter is adjusted according to the state of the base station.

In an exemplary embodiment, the operation may include:

for the base station in a good state, applying a TCP layer parameter configuration corresponding to good transmission; and for the base station in a poor state, applying a TCP layer parameter configuration corresponding to poor transmission.

In an exemplary embodiment, the state of the base station may be reflected by a transmission state, and the operation of adjusting the TCP layer parameter according to the state of the base station includes the following operations.

For the base station in a good transmission state, a TCP layer parameter configuration corresponding to the good transmission state is applied; and for the base station in a poor transmission state, a TCP layer parameter configuration corresponding to the poor transmission state is applied.

In an exemplary embodiment, the state of the base station may be reflected by a busy state or an idle state, and the operation of adjusting the TCP layer parameter according to the state of the base station includes the following operations.

For the base station in the busy state, a TCP layer parameter configuration corresponding to a busy time period is applied; and for the base station in the idle state, a TCP layer parameter configuration corresponding to an idle time period is applied.

In an exemplary embodiment, the state of the base station may be reflected by a load state, and the operation of adjusting the TCP layer parameter according to the state of the base station includes the following operations.

For the base station in a high load state, a TCP layer parameter configuration corresponding to the high load state is applied; for the base station in a medium load state, a TCP layer parameter configuration corresponding to the medium load state is applied; and for the base station in a low load state, a TCP layer parameter configuration corresponding to the low load state is applied.

In an exemplary embodiment, the state of the base station may be reflected by a transmission state and a load state, and the operation of adjusting the TCP layer parameter according to the state of the base station includes the following operations.

For the base station in a good transmission state, a TCP layer parameter configuration corresponding to a high load state is applied in a case where the base station in the high load state, a TCP layer parameter configuration corresponding to a medium load state is applied in a case where the base station in the medium load state, and a TCP layer parameter configuration corresponding to a low load state is applied in a case where the base station in the low load state. For the base station in a poor transmission state, a TCP layer parameter configuration corresponding to the poor transmission state is applied.

In an exemplary embodiment, the TCP layer parameter may include, but is not limited to, a parameter relevant to a congestion window (cwnd), such as a maximum transmission window, and a parameter relevant to sending step speed, such as the number of sent data packets.

In an exemplary embodiment, the TCP layer parameter corresponding to different states of the base station may be preconfigured.

The network transmission control method provided in the embodiments of the present disclosure solves the problem that a TCP parameter cannot be adjusted according to a feature of a wireless base station in a transmission network including a 3GPP wireless network. By means of the network transmission control method of the embodiments of the present disclosure, TCP packets are most efficiently sent according to obtained wireless network knowledge of a base station, thereby preventing network transmission problems, such as data packet congestion, data packet loss, and data packet transmission delay increase of the base station. In addition, redundant TCP retransmission is avoided, and wireless resources are fully utilized, thereby improving user experience.

The network transmission control method of the embodiments of the present disclosure may further include the following operations.

According to the resource feature of the base station obtained in a current control period, TCP layer parameters correspondingly configured for different states of the base station are adjusted, so that the TCP layer parameters correspondingly configured for different states of the base station reach reasonable values. The reasonable values enable the system performance to be excellent or even optimal, so that the system has less retransmission and less delay.

For example, a first expected value of a TCP downlink retransmission rate (based on the amount of data) and a second expected value of the TCP downlink retransmission rate (based on the number of packets) are preset, and if a value obtained in a current control period is greater than the first expected value and/or the second expected value, the TCP layer parameter is decreased, for example, a parameter relevant to a congestion window is decreased, a parameter relevant to a sending step speed is decreased, and so on. It should be noted that the amount to be decreased is determined according to an actual application scenario, and it is emphasized here that a change trend of the TCP layer parameter is to decrease the TCP layer parameter. If the value obtained in the current control period is not greater than the first expected value and/or the second expected value, the TCP layer parameter remains unchanged.

According to the embodiments of the present disclosure, the TCP layer parameter value is dynamically adjusted, thereby ensuring the rationality of the TCP layer parameter value.

The embodiments of the present disclosure also provide a computer-readable storage medium, which stores computer-executable instructions, wherein the computer-executable instructions are used for executing any one of the foregoing embodiments of the network transmission control method.

The embodiments of the present disclosure also provide an apparatus for implementing network transmission control, including a processor and a memory; the memory stores a computer program which is able to run on the processor and is used for executing any one of the foregoing embodiments of the network transmission control method.

Figure 2:
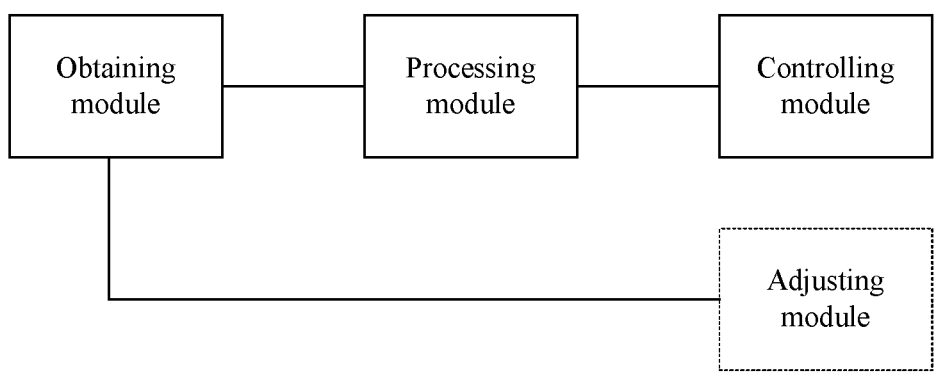
FIG. 2 is a schematic structural diagram of a network transmission control apparatus according to some embodiments of the present disclosure.

FIG. 2 is a schematic structural diagram of a network transmission control apparatus according to the embodiments of the present disclosure. As shown in FIG. 2, the apparatus at least includes: an obtaining module, a processing module and a controlling module.

The obtaining module is configured to obtain a resource feature of a base station.

The processing module is configured to determine a state of the base station according to the obtained resource feature of the base station.

The controlling module is configured to adjust a TCP layer parameter according to the state of the base station.

The network transmission control apparatus of the embodiments of the present disclosure further includes:

an adjusting module, configured to adjust configured TCP layer parameter values corresponding to different states of a base station according to a resource feature of the base station obtained in a current control period, so that the configured TCP layer parameter values corresponding to different states of the base station reach a reasonable value.

In an exemplary embodiment, the resource feature of the base station may include any one or any combination of the following:

A TCP downlink retransmission rate (which may be based on the amount of data or the number of packets), an RTT, a TCP downlink average rate, a PDCP cache, an air interface rate, etc.

In an exemplary embodiment, the processing module is configured to process, according to a preset processing strategy, obtained resource feature data of the base station within a control period to obtain a processing result reflecting the state of the base station; and determine the state of the base station according to the processing result.

In an exemplary embodiment, the processing module is configured to determine the state of the base station according to the processing result in a following manner: comparing the processing result with a preset threshold, and determining the state of the base station according to a comparison result, for example, the state of the base station may include whether a transmission state is good or poor, or whether the base station is busy or idle, or whether a load of the base station is high or low.

In an exemplary embodiment, the controlling module is configured to: for the base station in a good state, apply a TCP layer parameter configuration corresponding to good transmission; and for the base station in a poor state, apply a TCP layer parameter configuration corresponding to poor transmission.

In an exemplary embodiment, the controlling module is configured to:

in a case where the state of the base station includes a transmission state, for the base station in a good transmission state, apply a TCP layer parameter configuration corresponding to the good transmission state; and for the base station in a poor transmission state, apply a TCP layer parameter configuration corresponding to the poor transmission state; or, in a case where the state of the base station includes a busy state and an idle state, for the base station in the busy state, applying a TCP layer parameter configuration corresponding to an busy time period; and for the base station in the idle state, apply a TCP layer parameter configuration corresponding to an idle time period; or, in a case where the state of the base station includes a load state, for a base station in a high load state, apply a TCP layer parameter configuration corresponding to the high load state; for the base station in a medium load state, apply a TCP layer parameter configuration corresponding to the medium load state; and for the base station in a low load state, applying a TCP layer parameter configuration corresponding to the low load state; or, in a case where the state of the base station includes a transmission state and a load state, for the base station in a good transmission state, apply a TCP layer parameter configuration corresponding to a high load state in a case where the base station in the high load state, apply a TCP layer parameter configuration corresponding to a medium load state in a case where the base station in the medium load state, and apply a TCP layer parameter configuration corresponding to a low load state in a case where the base station in the low load state; and for the base station in a poor transmission state, apply a TCP layer parameter configuration corresponding to the poor transmission state.

Figure 3:
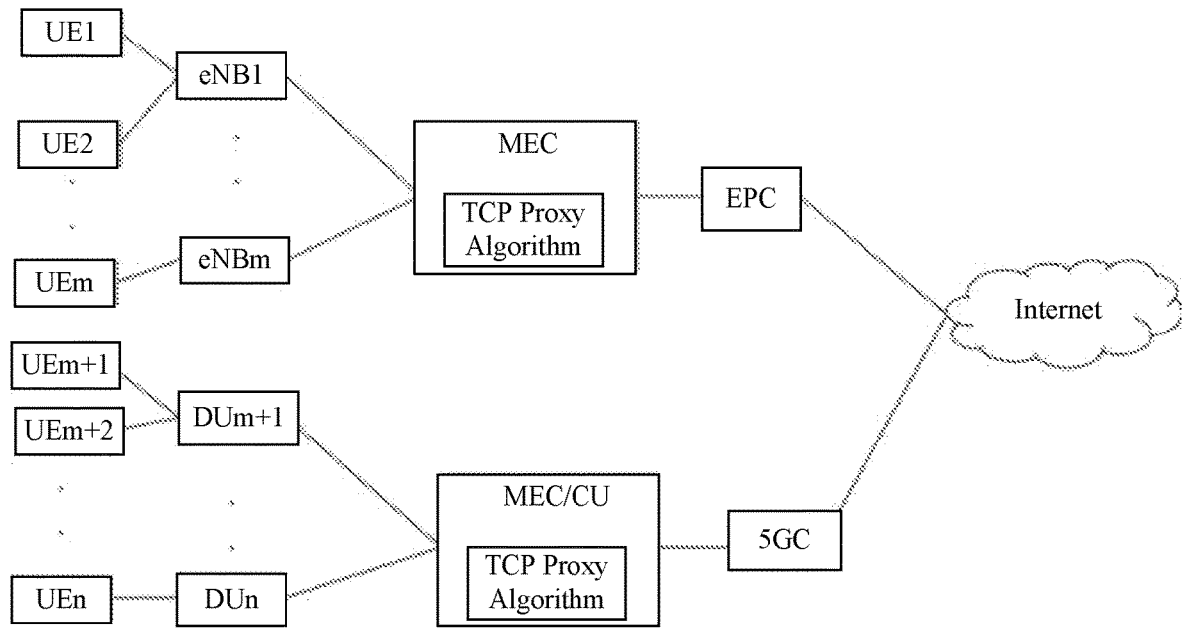
FIG. 3 is a schematic diagram of a scenario according to a first embodiment of the present disclosure.
Figure 4:
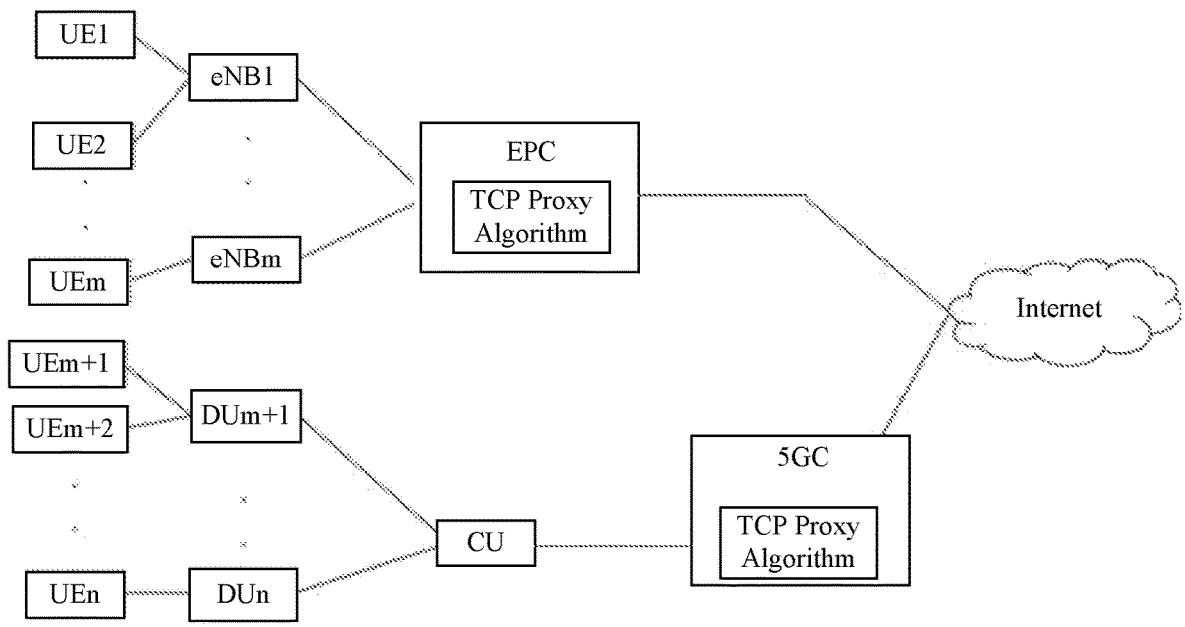
FIG. 4 is a schematic diagram of a scenario according to a third embodiment of the present disclosure.

The network transmission control apparatus in the embodiments of the present disclosure may be an independent network entity, or may be, as shown in FIGS. 3 and 4, an edge computing node disposed between a base station and a core network, such as a Multi-Access Edge Computing (MEC) node, or may be disposed in a big data platform or a cloud computing apparatus of the core network.

The network transmission control scheme of the present disclosure will be described below in detail with reference to several embodiments.

First Embodiment

FIG. 3 is a schematic diagram of a scenario of a first embodiment of the present disclosure. As shown in FIG. 3, assuming that a network transmission control apparatus is deployed in an edge computing node such as an MEC, a transmission state of a base station is identified according to performance statistics collected by the edge computing node, and a TCP parameter is adjusted based on the transmission state of the base station.

First, data is collected. The MEC collects TCP performance statistics of the base station. In the first embodiment, a data collection period is set as, for example, 1 hour, 2 hours, 6 hours, 12 hours, 1 day, 3 days, 5 days, 7 days, 14 days, 30 days, or the like. Data of one data collection period is collected, for example, the data collection period is 7 days. In the first embodiment, the transmission of the base station is analyzed to obtain the TCP downlink retransmission rate (based on the amount of data) and the TCP downlink retransmission rate (based on the number of packets) as the resource feature of the base station. The collected data set A={TCP downlink retransmission rate (based on the amount of data), TCP downlink retransmission rate (based on the number of packets)}.

In the first embodiment, the data collection period is 7 days, and therefore, the TCP downlink retransmission rate (based on the amount of data) and the TCP downlink retransmission rate (based on the number of packets) of the same hour per day in the data collection period need to be respectively averaged, so that 24 sets of data of an average TCP downlink retransmission rate (based on the amount of data) and 24 sets of data of an average TCP downlink retransmission rate (based on the number of packets) are obtained.

Then, the data for each hour is subjected to the following judgment: for a certain hour (for example, 9:00~10:00), Q=average TCP downlink retransmission rate (based on the amount of data)×k1+average TCP downlink retransmission rate (based on the number of packets)×k2, where k1 and k2 are in the range of 0~1. In the first embodiment, k1=0.5, k2=0.5. If the calculated Q>=a preset first threshold, then it is determined that the transmission state of the base station is poor within the hour; otherwise, it is determined that the transmission state of the base station is good within the hour. After such processing, the transmission state of the base station may include 24 values.

Then, according to the obtained transmission state value of the base station, if among 24 values reflecting the transmission state of the base station, n=15 or more than 15 reflect that the transmission state of the base station is poor, then it is determined that the transmission state of the base station is poor, where n can be preset and can be modified according to the actual situation; otherwise, it is determined that the transmission state of the base station is good.

Finally, for a base station with a good transmission state, a TCP layer parameter configuration corresponding to good transmission in table 1 is applied; and for the base station in a poor transmission state, a TCP layer parameter configuration corresponding to bad transmission in table 1 is applied.

TABLE 1

| TCP layer parameter | Good transmission state | Bad transmission state |
| --- | --- | --- |
| Parameter relevant to the transmitting end window (e.g. the maximum transmission window) | 2 Mbyte | 1 Mbyte |
| Parameter relevant to sending step speed (e.g., the number of sent data packets) | 10 | 5 |

Further, the configured TCP layer parameter value corresponding to good transmission state or poor transmission state can be dynamically adjusted according to the obtained TCP downlink retransmission rate (based on the amount of data) and TCP downlink retransmission rate (based on the number of packets), until a reasonable value is reached. For example, an expected value of a TCP downlink retransmission rate (based on the amount of data) and an expected value of a TCP downlink retransmission rate (based on the number of packets) are set, and if a statistical value is greater than the expected value, the TCP layer parameter {a parameter relevant to a sending end window, a parameter relevant to a sending step speed} is decreased; otherwise, the TCP layer parameter remains unchanged.

Second Embodiment

Assuming that a network transmission control apparatus is deployed in an MEC, information reported wirelessly, such as customized contents directly reported from a base station to an MEC interface or a Measurement Report (MR) reported by a base station, is used to identify a load state (busy/idle) of the base station, and a TCP parameter is adjusted based on the load state of the base station.

First, data is collected. In the embodiment, the data set B={PDCP available cache, air interface rate} is extracted from the MR reported by the base station.

In the second embodiment, for example, if the PDCP available cache and the air interface rate for each minute are collected, then the data for each minute needs to be accumulated to obtain data for each hour, so as to obtain an index value of the PDCP available cache and an index value of the air interface rate per hour.

Then, the data for each hour is subjected to the following judgment: according to a clustering algorithm, such as a k-means algorithm, the data set B is divided into two types: busy hour or idle hour. In this way, 24 values reflecting the load state of each base station, i.e., the busy time period or the idle time period, can be obtained for each base station.

The load state values reflecting the busy hours of the base station are merged. In the embodiment, for example, each base station may configure at most 3 busy time periods, and each busy time period may be represented by a busy start time and a busy end time. For two calculated load state values reflecting the busy time period of the base station, if the time interval between the start time of the second busy time period and the end time of the first busy time period is less than or equal to (<=) 2 hours, the two busy time periods are merged as one busy time period, the start time of the busy time period is the start time of the first busy time period, and the end time of the busy time period is the end time of the second busy time period. For example, if the busy time period is 08:00~09:00, 11:00~12:00, 13:00~14:00, the busy time period is 08:00~14:00 after the merging.

In the embodiment, each base station may set at most three busy time periods. Therefore, when the number of the merged busy time periods exceeds three busy time periods, two busy time periods with the shortest time interval therebetween among all busy time periods are merged, and the same processing is circularly performed until 3 busy time periods remain.

Then, when a base station is in a busy time period, a TCP layer parameter configuration corresponding to the busy time period in table 2 is applied; and when the base station is in an idle time period, a TCP layer parameter configuration corresponding to the idle time period in Table 2 is applied.

TABLE 2

| TCP layer parameter | Busy time period | Idle time period |
| --- | --- | --- |
| Parameter relevant to the transmitting end window (e.g. the maximum transmission window) | 1 Mbyte | 3 Mbyte |
| Parameter relevant to sending step speed (e.g., the number of sent data packets) | 10 | 15 |

Further, the configured TCP layer parameter value corresponding to busy or idle state can be dynamically adjusted according to the TCP downlink retransmission rate (based on the number of packets) and the RTT until a reasonable value is reached. For example, an expected value of a TCP downlink retransmission rate (based on the number of packets) and an expected value of a wireless RTT are set, and if a statistical value is greater than the expected value, the TCP layer parameter {parameter relevant to a sending end window, parameter relevant to a sending step speed} is decreased; otherwise, the TCP layer parameter remains unchanged.

Third Embodiment

FIG. 4 is a schematic diagram of a scenario according to a third embodiment of the present disclosure. As shown in FIG. 4, assuming that a network transmission control apparatus is deployed in a cloud computing platform as shown in FIG. 4, a cloud computing platform deployed in a 5G core network (5GC) or a cloud computing platform deployed in a 4G core network, i.e., an Evolved Packet Core (EPC) identifies a load state (such as high load/medium load/low load) of a base station based on performance statistics of the cloud computing platform, and a TCP layer parameter is adjusted based on the load state of the base station.

First, data is collected. In the embodiment, the cloud computing platform collects statistics on TCP performance of the base station. In the third embodiment, the data collection period is set to 3 days, and the collected data set A={TCP downlink retransmission rate (based on the amount of data), TCP downlink average rate}.

During data processing, the TCP downlink retransmission rate (based on the amount of data) and the TCP downlink average rate of the same hour per day in the data collection period need to be respectively averaged.

Next, the data for each hour is subjected to the following judgment.

If the average TCP downlink retransmission rate (based on the amount of data) is greater than or equal to a first threshold thrd1, or the average TCP downlink average rate is less than or equal to a second threshold thrd2, it is determined that the load state of the base station within the hour is determined to be a high load state.

If the average TCP downlink retransmission rate (based on the amount of data) is greater than or equal to a third threshold thrd3, or the average TCP downlink average rate is less than or equal to a fourth threshold thrd4, the load state of the base station within the hour is determined to be a medium load state.

If the average TCP downlink retransmission rate (based on the amount of data) is greater than a third threshold thrd3 and the average TCP downlink average rate is greater than a fourth threshold thrd4, the load state of the base station within the hour is determined to be a low load state.

Thus, 24 load state values (among three states) are obtained for each base station, and the state of the base station corresponding to the load state value with the largest occurrence is determined as the current state of the base station. For example, if the high load value occurs for the maximum number of times for a base station, the state of the base station is a high load state.

Finally, for a base station with a high load, a TCP layer parameter configuration corresponding to a high load in table 3 is applied; for a base station with a medium load, a TCP layer parameter configuration corresponding to a medium load in table 3 is applied; for a base station with a low load, a TCP layer parameter configuration corresponding to a low load in table 3 is applied.

TABLE 3

| TCP layer parameter | High load | Medium load | Low load |
|---|---|---|---|
| Parameter relevant to the transmitting end window (e.g. the maximum transmission window) | 1 Mbyte | 3 Mbyte | 5 Mbyte |
| Parameter relevant to sending step speed (e.g., the number of sent data packets) | 10 | 15 | 20 |

The foregoing descriptions are merely exemplary embodiments of the present disclosure, but are not intended to limit the scope of protection of the present disclosure. Any modifications, equivalent replacements, improvements and the like made within the principle of the present disclosure shall belong to the scope of protection of the present disclosure.

What is claimed is:

1. A network transmission control method, comprising:
    obtaining a resource feature of a base station;
    processing, according to a preset processing strategy, obtained resource feature data of the base station within a control period to obtain a processing result reflecting a state of the base station; and comparing the processing result with a preset threshold, and determining the state of the base station according to a comparison result; and
    adjusting a Transmission Control Protocol (TCP) layer parameter according to the state of the base station;
    wherein the resource feature of the base station comprises a TCP downlink retransmission rate based on an amount of data and a TCP downlink retransmission rate based on the number of packets,
    processing the obtained resource feature of the base station according to the preset processing strategy comprises:
    calculating the processing result Q=TCP downlink retransmission rate based on the amount of data×k1+TCP downlink retransmission rate based on the number of packets×k2, where k1 and k2 are in a range of 0 to 1; or, respectively calculating an average value of the TCP downlink retransmission rate based on the amount of data and an average value of the TCP downlink retransmission rate based on the number of packets for each same hour per day in a control period, and calculating the processing result Q for each hour=TCP downlink retransmission rate based on the amount of data×k1+TCP downlink retransmission rate based on the number of packets×k2, where k1 and k2 are in a range of 0 to 1;
    comparing the processing result with a preset threshold, and determining the state of the base station according to a comparison result comprises:
    for the processing result Q for each hour, in response to determining that the processing result Q is greater than or equal to a preset first threshold, determining that a transmission state of the base station is poor within the hour; and in response to determining that the processing result Q is smaller than the preset first threshold, determining that the transmission state of the base station is good within the hour.

2. The network transmission control method according to claim 1, wherein the comparison result comprises:
    whether a transmission state is good or poor, or whether the base station is busy or idle, or whether a load of the base station is high or low.

3. The network transmission control method according to claim 1, wherein adjusting a TCP layer parameter according to the state of the base station comprises:
    for the base station in a good state, applying a TCP layer parameter configuration corresponding to good transmission; and
    for the base station in a poor state, applying a TCP layer parameter configuration corresponding to poor transmission.

4. The network transmission control method according to claim 3, wherein
    the state of the base station comprises a transmission state; and adjusting a TCP layer parameter according to the state of the base station comprises: for the base station in a good transmission state, applying a TCP layer parameter configuration corresponding to the good transmission state; for the base station in a poor transmission state, applying a TCP layer parameter configuration corresponding to the poor transmission state; or,
    the state of the base station comprises a busy state and an idle state; and adjusting a TCP layer parameter according to the state of the base station comprises: for the base station in the busy state, applying a TCP layer parameter configuration corresponding to a busy time period; for the base station in the idle state, applying a TCP layer parameter configuration corresponding to an idle time period; or,
    the state of the base station comprises a load state; and adjusting a TCP layer parameter according to the state of the base station comprises: for the base station in a high load state, applying a TCP layer parameter configuration corresponding to the high load state; for the base station in a medium load state, applying a TCP layer parameter configuration corresponding to the medium load state; for the base station in a low load state, applying a TCP layer parameter configuration corresponding to the low load state; or, the state of the base station comprises a transmission state and a load state; and adjusting a TCP layer parameter according to the state of the base station comprises: for the base station in a good transmission state, applying a TCP layer parameter configuration corresponding to a high load state in response to determining that the base station is in the high load state, applying a TCP layer parameter configuration corresponding to a medium load state in response to determining that the base station is in the medium load state, and applying a TCP layer parameter configuration corresponding to a low load state in response to determining that the base station is in the low load state; for the base station in a poor transmission state, applying a TCP layer parameter configuration corresponding to the poor transmission state.

5. The network transmission control method according to claim 1, further comprising:
adjusting the TCP layer parameter according to the resource feature of the base station obtained according to a preset control period.

6. The network transmission control method according to claim 1, wherein the resource feature of the base station further comprises a Round-Trip Time (RTT).

7. The network transmission control method according to claim 1, wherein the base station comprises: a Third Generation (3G) base station, a Fourth Generation (4G) base station or a Fifth generation (5G) base station.

8. A non-transitory computer-readable storage medium, storing computer-executable instructions, wherein the computer-executable instructions are used for executing the operations of network transmission control method according to claim 1.

9. An apparatus for implementing network transmission control, comprising a processor and a memory, wherein the memory stores a computer program which is able to run on the processor and is used for executing the operations of the network transmission control method according to claim 1.

10. The network transmission control method according to claim 1, wherein the TCP layer parameter comprises a parameter relevant to a congestion window, and a parameter relevant to a sending step speed.

11. A network transmission control method, comprising:
obtaining a resource feature of a base station;
processing, according to a preset processing strategy, obtained resource feature data of the base station within a control period to obtain a processing result reflecting a state of the base station; and comparing the processing result with a preset threshold, and determining the state of the base station according to a comparison result; and
adjusting a Transmission Control Protocol (TCP) layer parameter according to the state of the base station;
wherein the resource feature of the base station comprises a Packet Data Convergence Protocol (PDCP) available cache and an air interface rate,
processing the obtained resource feature of the base station according to the preset processing strategy comprises: if in response to that the collected PDCP available cache and the air interface rate are data for each minute, accumulating the PDCP available cache and the air interface rate for each minute to obtain the PDCP available cache and the air interface rate for each hour; classifying the available PDCP cache and the air interface rate into busy hours and idle hours; and merging the busy hours of the base station to obtain a busy time period.

12. The network transmission control method according to claim 11, wherein adjusting a TCP layer parameter according to the state of the base station comprises:
for the base station in a good state, applying a TCP layer parameter configuration corresponding to good transmission; and
for the base station in a poor state, applying a TCP layer parameter configuration corresponding to poor transmission.

13. A non-transitory computer-readable storage medium, storing computer-executable instructions, wherein the computer-executable instructions are used for executing the operations of network transmission control method according to claim 11.

14. An apparatus for implementing network transmission control, comprising a processor and a memory, wherein the memory stores a computer program which is able to run on the processor and is used for executing the operations of the network transmission control method according to claim 11.

15. A network transmission control method, comprising:
obtaining a resource feature of a base station;
processing, according to a preset processing strategy, obtained resource feature data of the base station within a control period to obtain a processing result reflecting a state of the base station; and comparing the processing result with a preset threshold, and determining the state of the base station according to a comparison result; and
adjusting a Transmission Control Protocol (TCP) layer parameter according to the state of the base station;
wherein the resource feature of the base station comprises the TCP downlink retransmission rate based on the amount of data and a TCP downlink average rate,
processing the obtained resource feature of the base station according to the preset processing strategy comprises: respectively calculating an average value of the TCP downlink retransmission rate based on the amount of data and an average value of the TCP downlink average rate for each same hour per day in a control period.

16. The network transmission control method according to claim 15, wherein comparing the processing result with a preset threshold, and determining the state of the base station according to a comparison result comprises:
in response to determining that the TCP downlink retransmission rate based on the amount of data is greater than or equal to a first threshold or the TCP downlink average rate is less than or equal to a second threshold, determining that the state of the base station within the hour is a high load state;
in response to determining that the TCP downlink retransmission rate based on the amount of data is greater than or equal to a third threshold or the TCP downlink average rate is less than or equal to a fourth threshold, determining that the state of the base station within the hour is a medium load state;
in response to determining that the TCP downlink retransmission rate based on the amount of data is less than a third threshold and the TCP downlink average rate is greater than a fourth threshold, determining that the state of the base station within the hour is a low load state.

17. A non-transitory computer-readable storage medium, storing computer-executable instructions, wherein the computer-executable instructions are used for executing the operations of network transmission control method according to claim 15.

18. An apparatus for implementing network transmission control, comprising a processor and a memory, wherein the memory stores a computer program which is able to run on the processor and is used for executing the operations of the network transmission control method according to claim 15.

19. The network transmission control method according to claim 15, wherein adjusting a TCP layer parameter according to the state of the base station comprises:
  for the base station in a good state, applying a TCP layer parameter configuration corresponding to good transmission; and
  for the base station in a poor state, applying a TCP layer parameter configuration corresponding to poor transmission.

20. The network transmission control method according to claim 19, wherein
  the state of the base station comprises a transmission state; and adjusting a TCP layer parameter according to the state of the base station comprises: for the base station in a good transmission state, applying a TCP layer parameter configuration corresponding to the good transmission state; for the base station in a poor transmission state, applying a TCP layer parameter configuration corresponding to the poor transmission state; or,
  the state of the base station comprises a busy state and an idle state; and adjusting a TCP layer parameter according to the state of the base station comprises: for the base station in the busy state, applying a TCP layer parameter configuration corresponding to a busy time period; for the base station in the idle state, applying a TCP layer parameter configuration corresponding to an idle time period; or,
  the state of the base station comprises a load state; and adjusting a TCP layer parameter according to the state of the base station comprises: for the base station in a high load state, applying a TCP layer parameter configuration corresponding to the high load state; for the base station in a medium load state, applying a TCP layer parameter configuration corresponding to the medium load state; for the base station in a low load state, applying a TCP layer parameter configuration corresponding to the low load state; or,
  the state of the base station comprises a transmission state and a load state; and adjusting a TCP layer parameter according to the state of the base station comprises: for the base station in a good transmission state, applying a TCP layer parameter configuration corresponding to a high load state in response to determining that the base station is in the high load state, applying a TCP layer parameter configuration corresponding to a medium load state in response to determining that the base station is in the medium load state, and applying a TCP layer parameter configuration corresponding to a low load state in response to determining that the base station is in the low load state; for the base station in a poor transmission state, applying a TCP layer parameter configuration corresponding to the poor transmission state.

* * * * *